(12) United States Patent
Zhang

(10) Patent No.: US 12,190,146 B2
(45) Date of Patent: Jan. 7, 2025

(54) APPLICATION CONTROL METHOD AND APPARATUS, TERMINAL, AND COMPUTER-READABLE STORAGE MEDIUM

(71) Applicant: ZTE CORPORATION, Guangdong (CN)

(72) Inventor: Yuanyuan Zhang, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 517 days.

(21) Appl. No.: 17/606,451

(22) PCT Filed: Jan. 8, 2020

(86) PCT No.: PCT/CN2020/071028
§ 371 (c)(1),
(2) Date: Oct. 26, 2021

(87) PCT Pub. No.: WO2020/220748
PCT Pub. Date: Nov. 5, 2020

(65) Prior Publication Data
US 2022/0197690 A1 Jun. 23, 2022

(30) Foreign Application Priority Data
Apr. 30, 2019 (CN) .......................... 201910364434.2

(51) Int. Cl.
*G06F 9/48* (2006.01)
*G06F 9/445* (2018.01)
(52) U.S. Cl.
CPC .......... *G06F 9/485* (2013.01); *G06F 9/44505* (2013.01)

(58) Field of Classification Search
CPC ...................................................... G06F 9/485
See application file for complete search history.

(56) References Cited

U.S. PATENT DOCUMENTS

| 8,407,728 | B2 * | 3/2013 | Gustafsson | ............. G06F 9/544 |
| | | | | 709/227 |
| 8,874,096 | B2 | 10/2014 | Nakajima | |

(Continued)

FOREIGN PATENT DOCUMENTS

| CN | 106055974 A | 10/2016 |
| CN | 106126259 A | 11/2016 |

(Continued)

OTHER PUBLICATIONS

ZTE Corporation, International Search Report, PCT/CN2020/071028, Mar. 26, 2020, 7 pgs.

(Continued)

*Primary Examiner* — Charlie Sun
(74) *Attorney, Agent, or Firm* — MH2 TECHNOLOGY LAW GROUP LLP

(57) ABSTRACT

Embodiments of the present disclosure provide an application control method and an apparatus, a terminal, and a computer-readable storage medium. The application control method includes: configure a temporary unfreezing rule for an application currently frozen in response to freezing a running application; temporarily unfreeze a frozen application in response to monitoring that the frozen application currently meets the temporary unfreezing rule corresponding to the frozen application; and re-freeze a temporarily unfrozen application in response to monitoring that the temporarily unfrozen application currently meets a re-freezing rule corresponding to the temporarily unfrozen application.

15 Claims, 4 Drawing Sheets

S101
In response to freezing a running application, a corresponding temporary unfreezing rule is configured for the application currently frozen S102
In response to monitoring that a frozen application currently meets the temporary unfreezing rule corresponding thereto, the frozen application is temporarily unfrozen S103
In response to monitoring that a temporarily unfrozen application currently meets a re-freezing rule corresponding thereto, the temporarily unfrozen application is re-frozen

(56) References Cited

U.S. PATENT DOCUMENTS

| | | |
|---|---|---|
| 2013/0067475 A1 | 3/2013 | Singh et al. |
| 2015/0160976 A1 | 6/2015 | Kim et al. |
| 2019/0108076 A1 | 4/2019 | Huang et al. |
| 2020/0301731 A1* | 9/2020 | Fang ..................... G06F 9/485 |

FOREIGN PATENT DOCUMENTS

| | | |
|---|---|---|
| CN | 106231094 A | 12/2016 |
| CN | 106250230 A | 12/2016 |
| CN | 106293008 A | 1/2017 |
| CN | 106713490 A | 5/2017 |
| CN | 107957771 A | 4/2018 |
| CN | 108055693 A | 5/2018 |
| CN | 108664285 A | 10/2018 |
| WO | 2017219535 A1 | 12/2017 |

OTHER PUBLICATIONS

ZTE Corporation, Extended European Search Report, EP 20798825.4, May 12, 2022, 10pgs.
Chinese First Office Action dated Jul. 22, 2023 in corresponding Chinese Application No. 201910364434.2, translated, 16 pages.
Decision of Rejection dated Jun. 28, 2024 in corresponding Chinese Application No. 201910364434.2, translated, 16 pages.

* cited by examiner

APPLICATION CONTROL METHOD AND APPARATUS, TERMINAL, AND COMPUTER-READABLE STORAGE MEDIUM

CROSS REFERENCE TO RELATED APPLICATIONS

The present application is a United States National Stage Application filed under 35 U.S.C. § 371 of PCT Patent Application Serial No. PCT/CN2020/071028, filed on Jan. 8, 2020, which claims priority to Chinese patent application No. 201910364434.2, entitled "APPLICATION CONTROL METHOD AND APPARATUS, TERMINAL, AND COMPUTER-READABLE STORAGE MEDIUM," filed Apr. 30, 2019, each of which is incorporated by reference herein in its entirety.

TECHNICAL FIELD

Embodiments of the present disclosure relate to, but are not limited to, the field of communication, in particular to, but not limited to, an application control method and an application control apparatus, a terminal, and a computer-readable storage medium.

BACKGROUND

A smart terminal has become an important tool in people's life and work. An endurance problem of a battery life the smart terminal is a shortcoming of all kinds of smart terminals. One of the main reasons for shortening the endurance of the terminal is the data transmission and reception of a background application of the terminal.

SUMMARY

An application control method and an apparatus, a terminal, and a computer-readable storage medium provided by embodiments of the present disclosure mainly solve the technical problems of a current unreasonable control method for a terminal background application and a poor user experience satisfaction.

In order to solve the above technical problems, some embodiments of the present disclosure provide an application control method, including: configuring a temporary unfreezing rule for an application currently frozen in response to freezing a running application; temporarily unfreezing a frozen application in response to monitoring that the frozen application currently meets the temporary unfreezing rule corresponding to the frozen application; and re-freezing a temporarily unfrozen application in response to monitoring that the temporarily unfrozen application currently meets a re-freezing rule corresponding to the temporarily unfrozen application.

In addition, the configuring a temporary unfreezing rule for an application currently frozen includes: configuring the temporary unfreezing rule for the application currently frozen according to an application type of the application currently frozen as well as a corresponding relationship between the application type and the temporary unfreezing rule.

In addition, the corresponding relationship between the application type and the temporary unfreezing rule includes: a first temporary unfreezing rule corresponding to a first application type, where the first temporary unfreezing rule includes: detecting that the frozen application currently has data to be processed; and a second temporary unfreezing rule corresponding to a second application type, where the second temporary unfreezing rule includes at least one of the following: a continuous freezing duration of the frozen application reaches a preset freezing duration threshold; and a cache amount of the current data to be processed of the frozen application reaches a preset data cache amount threshold.

In addition, the corresponding relationship between the application type and the temporary unfreezing rule further includes: a third temporary unfreezing rule corresponding to a third application type, where the third temporary unfreezing rule includes: not unfreezing the frozen application.

In addition, the application control method further includes: in response to that the application type of the frozen application is the third application type, and data to be processed for the frozen application is acquired, discarding the data to be processed acquired.

In addition, the data to be processed includes network data sent to the frozen application.

In addition, the re-freezing rule includes at least one of the following: an unfrozen duration of the temporarily unfrozen application reaches a preset unfrozen duration threshold; the temporarily unfrozen application currently finishes processing its corresponding data to be processed; and the temporarily unfrozen application does not process data for a preset duration.

In addition, the method further includes: releasing a freezing management of the frozen application in response to monitoring that a freezing management END condition of the frozen application is triggered; where the freezing management END condition includes at least one of the following: the frozen application stops running; the frozen application is switched to a foreground to run; it is detected that the terminal screen turns to a bright screen in a case that the frozen application was frozen due to that the terminal screen turned to a dark screen.

In order to solve the above problems, some embodiments of the present disclosure further provide an application control apparatus, including: a freezing management module, configured to: configure a temporary unfreezing rule for an application currently frozen in response to freezing a running application; temporarily unfreeze a frozen application in response to monitoring that the frozen application currently meets the temporary unfreezing rule corresponding to the frozen application; and re-freeze a temporarily unfrozen application in response to monitoring that the temporarily unfrozen application currently meets a re-freezing rule corresponding to the temporarily unfrozen application.

In order to solve the above problems, some embodiments of the present disclosure further provide a terminal, including a processor, a memory and a communication bus; where the communication bus is configured to connect the processor and the memory; and the processor is configured to execute a computer program stored in the memory to implement the application control method as described above.

In order to solve the above problems, some embodiments of the present disclosure further provide a computer-readable storage medium storing one or more computer programs, and the one or more computer programs may be executed by one or more processors to implement the application control method as described above.

Other features and corresponding beneficial effects of the present disclosure are described in the later part of the specification, and it shall be understood that at least some beneficial effects become obvious from the description in the specification of the present disclosure.

DETAILED DESCRIPTION

In order to make objectives, technical solutions and advantages of the present disclosure clearer, some embodiments of the present disclosure will be explained below in detail with reference to accompanying drawings and embodiments. It should be understood that specific embodiments described here only explain the disclosure but do not constitute a limitation on the disclosure.

Those skilled in the art may understand that, in the following embodiments of the present disclosure, a terminal may be a mobile phone, a tablet computer, a laptop, a personal digital assistant, a smart TV, a mobile Internet device, a wearable device, or other terminal that may install an application client, or any other terminal or apparatus that may implement an application processing method of the present disclosure, which is not limited by the present disclosure.

The inventors noted that in order to improve the endurance of the terminal, there are generally the following two approaches currently in place for the problem of the data transmission and reception of the background application.

Approach 1: Clean up the background application on the terminal regularly. A disadvantage of this approach is that the user needs to restart the application when using it again, resulting in poor user experience.

Approach 2: After the application enters background, a firewall is configured for the application running in the background, thus prohibiting the application from sending and receiving packets in the background. However, when the application is prohibited from receiving and sending packets in the background through the firewall, all the sending and receiving packets sent to the application may be discarded, resulting in a perceivable packet loss or network inaccessibility of the application and a loss of a message pushed by a server, and a poor user experience satisfaction.

It can be seen that the current control methods for terminal background applications are unreasonable, resulting in poor user experience satisfaction.

First Embodiment

In view of the problem that the current control methods for a background application of a terminal are unreasonable, resulting in poor user experience satisfaction, this embodiment provides an application control method, which may provide a dynamic freezing strategy for the background application of the terminal, thereby achieving a balance between an energy saving and a normal packet transmission and reception, and improving user experience satisfaction.

Figure 1:
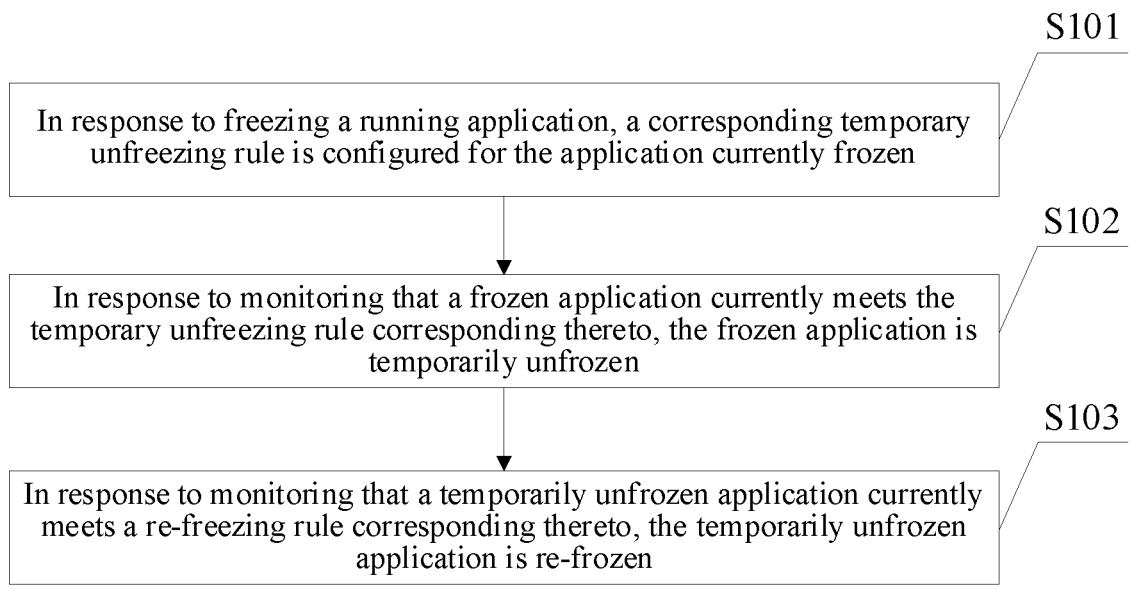
FIG. 1 is a schematic flow chart of an application control method provided in a first Embodiment of the present disclosure.

For ease of understanding, the application control method shown in FIG. 1 is taken as an example for description in this embodiment below. It should be understood that the application control method provided in this embodiment may be applied to, but not limited to, various smart terminals. Herein, as shown in FIG. 1, the application control method includes the following steps.

In S101, in response to freezing a running application, a corresponding temporary unfreezing rule is configured for the application currently frozen.

In this embodiment, a freezing condition for whether the running application needs to be frozen may be flexibly set. For example, in one example, the freezing condition may include, but is not limited to that: the application is switched from a foreground to a background; a screen of a terminal where the application is running changes from a bright screen to a dark screen; and a freezing instruction is received. The freezing instruction may be sent for an application running in the background or an application running in the foreground, which may be set flexibly according to an application scenario.

It should be understood that in this embodiment, any freezing method may be adopted when freezing the application, as long as it may make the application in a freezing state unable to run, thus saving energy consumption, but when the application needs to be used, it may not necessary to restart the application, but only need to unfreeze the application to make the application continue to run.

In this embodiment, a configuration manner of configuring the corresponding temporary unfreezing rule for the currently frozen application may be flexibly determined.

For example, in one example, a corresponding relationship table between an application list and the temporary unfreezing rule may be preset. The corresponding relationship table between the application list and the temporary unfreezing rule may include: application identification information of each application and temporary unfreezing rules respectively corresponding to each of the application identification information. In this embodiment, the corresponding relationship table between the application list and the temporary unfreezing rule may be set and/or updated by at least one of a terminal manufacturer, a service provider and a terminal user. In response to freezing an application, identification information of the frozen application may be extracted, so that a temporary unfreezing rule corresponding to the frozen application may be matched and acquired in the corresponding relationship table between the application list and the temporary unfreezing rule to configure the frozen application.

For another example, according to an application type to which the currently frozen application belongs as well as a preset corresponding relationship between the application type and the temporary unfreezing rule, a corresponding temporary unfreezing rule may be configured for the currently frozen application. The corresponding relationship between the application type and the temporary unfreezing rule may also be set and/or updated by at least one of the terminal manufacturer, the service provider and the terminal user. In addition, in this embodiment, a division manner of the application types of the applications may be flexibly adopted according to specific requirements. For example, the application may be classified according to a real-time requirement of the application for its data processing; or it may be classified according to a function that the application may realize, or it may be classified according to a provider category of the application, and so on.

For example, in an application scenario, the application may be divided into a first application type, a second application type and a third application type according to the real-time requirement of the application for its data processing.

The first application type may include an application requiring an instant processing of the data of the application, which may also be referred to as an instant messaging type. For example, it may include WeChat, QQ, Stock viewing, DingTalk, and other applications. Here, an exemplary classification criterion may be to determine whether a background data transmission and reception of the application allows to be delayed and whether a data interaction needs to be processed immediately.

The second application type may include an application whose data processing may be deferred for a certain period of time, and the time that may be deferred may be flexibly set according to specific requirements, which may be set to several minutes or tens of minutes. In this example, the second application type may also be referred to as a cyclic alignment data type, for example, it may include but not limited to mailbox, MicroBlog, forum and other applications. Here, an exemplary classification criterion may be to determine according to the requirements of the application for a background data processing, for example, the background data processing may be deferred for a period of time (such as several minutes to tens of minutes).

The third application type may include an application that the user does not care whether the application performs the data processing after being frozen. The third application type may also be referred to as a strictly controlled data type. An exemplary application may include but is not limited to a mobile phone reading application. Here, an exemplary classification criterion may be to determine according to whether the user cares about the data behavior of the application after the application is switched to the background.

For another example, in another application scenario, the application may be divided into a first application type, a second application type and a third application type according to a function realized by the application.

The first application type may include at least one of various applications that realize an office function.

The second application type may include at least one of various applications that realize a shopping function.

The third application type may include at least one of various applications that realize an entertainment function.

Other classification methods for the application may be flexibly set according to specific application scenarios and requirements, and the specific number of classifications for application classification may be flexibly set, which is not limited to the three types in the above examples. For example, it may be divided into two types, four types, five types, etc. as desired, which is not repeated here again.

In addition, in this embodiment, the corresponding relationship between the application type and the temporary unfreezing rule may be a one-to-one corresponding relationship between the application type and the temporary unfreezing rule, or there may be two or more application types corresponding to one temporary unfreezing rule, or one application type may correspond to two or more temporary unfreezing rules. The specific corresponding manners may be flexibly set as desired.

For ease of understanding, this embodiment takes a corresponding relationship between an application type and a temporary unfreezing rule as an example for description below, and the corresponding relationship is shown in Table 1 below.

TABLE 1

| Application type | Temporary unfreezing rule |
| --- | --- |
| First application type | First temporary unfreezing rule |
| Second application type | Second temporary unfreezing rule |

Herein, in an example, the first temporary unfreezing rule includes, but is not limited to, at least one of the following: detecting that the frozen application currently has data to be processed; and receiving a temporary unfreezing instruction.

In another example of this embodiment, the second temporary unfreezing rule may include, but is not limited to, at least one of the following: a continuous freezing duration of the frozen application reaches a preset freezing duration threshold; a cache amount of the current data to be processed of the frozen application reaches a preset data cache amount threshold; and the temporary unfreezing instruction is received. Here, it should be understood that a specific value of the freezing duration threshold in this embodiment may be flexibly set as desired, for example, it may be 10 minutes, 15 minutes, 20 minutes, etc. A specific value of the data cache amount threshold in this embodiment may also be flexibly set as desired.

In another example of this embodiment, the corresponding relationship between the application type and the temporary unfreezing rule may also include a third temporary unfreezing rule corresponding to a third application type, which is shown in Table 2 below.

TABLE 2

| Application type | Temporary unfreezing rule |
| --- | --- |
| First application type | First temporary unfreezing rule |
| Second application type | Second temporary unfreezing rule |
| Third application type | Third temporary unfreezing rule |

In an application scenario of this embodiment, the third temporary unfreezing rule may include, but is not limited to, not unfreezing the frozen application. In this case, in response to acquiring data to be processed of a certain frozen application, when it is determined that an application type of the frozen application belongs to the third application type, the frozen application is not temporarily unfrozen, and the acquired data to be processed may be discarded.

It should be understood that the above exemplary unfreezing rules as well as the corresponding relationship between the unfreezing rule and the application type may be flexibly adjusted as desired, and are not limited to the above examples. In addition, it should be understood that the data to be processed in this embodiment may include, but is not limited to, at least one of: network data from a network side, data sent by an application on other terminals, and data sent by other applications locally on the terminal.

In S102, in response to monitoring that a frozen application currently meets the temporary unfreezing rule corresponding thereto, the frozen application is temporarily unfrozen.

After the frozen application is temporarily unfrozen, the application may maintain a normal running state, so that the data to be processed of the application may be processed normally.

In S103, in response to monitoring that a temporarily unfrozen application currently meets a re-freezing rule corresponding thereto, the temporarily unfrozen application is re-frozen.

In this embodiment, after temporarily unfreezing a frozen application, it may also be monitored whether the application needs to be re-frozen, that is, dynamically freeze and unfreeze the application, so as to find a reasonable balance between terminal energy saving and a normal processing of application data, achieve the effect of reasonable energy saving without affecting the normal use of at least some applications, and improve the rationality of terminal energy saving control, thereby improving the satisfaction of user experience.

Therefore, in this embodiment, the re-freezing rule may be set for the temporarily unfrozen application. In an example of this embodiment, the same re-freezing rule may be set for each temporarily unfrozen application, or the re-freezing rules may be respectively set for different types of applications according to the application type. The specific method used may be set flexibly according to the needs of the user. For ease of understanding, this embodiment is explained with an example of several re-freezing rules below. In this example, the re-freezing rule includes, but is not limited to, at least one of the following: an unfrozen duration of the temporarily unfrozen application reaches a preset unfrozen duration threshold; the temporarily unfrozen application currently finishes processing its corresponding data to be processed; and the temporarily unfrozen application does not process data for a preset duration.

In this embodiment, the re-freezing rules corresponding to different application types may be the same. For example, a re-freezing rule corresponding to the first application type and a re-freezing rule corresponding to the second application type may be the same. In some examples, the re-freezing rules corresponding to different application types may be different, such as the following.

The re-freezing rule corresponding to the first application type may be that the temporarily unfrozen application currently finishes processing its corresponding data to be processed.

The re-freezing rule corresponding to the second application type may include at least one of the following: the unfrozen duration of the temporarily unfrozen application reaches the preset unfrozen duration threshold; the temporarily unfrozen application does not process data for the preset duration.

In this embodiment, the application control method may further include releasing a freezing management of a frozen application in response to monitoring that a freezing management END condition of the frozen application is triggered, where the frozen application includes at least one of a frozen application currently being in the freezing state and a frozen application currently being in the temporary unfreezing state. In this embodiment, after the freezing management of the frozen application is released, the application is no longer restricted by the above unfreezing and freezing rule. Furthermore, it should be understood that the freezing management END condition in this embodiment may also be flexibly set according to specific application scenarios. For example, the freezing management END condition may include, but is not limited to, at least one of the following: the frozen application stops running; the frozen application is switched to a foreground to run; and it is detected that the terminal screen turns to a bright screen currently for a frozen application whose frozen reason was that a terminal screen turned to a dark screen.

It can be seen that the application control method provided in this embodiment controls the application in a dynamic freezing and unfreezing manner, so that the application in the freezing state may no longer run, thereby improving the endurance capacity of the terminal; and when the application in the freezing state needs to be reused, it may be directly unfrozen without restarting the application. Besides, at least one application in the freezing state may be temporarily unfrozen and re-frozen dynamically as desired, so that the application may send and receive packets normally during a temporary unfreezing period, avoiding a perceivable packet loss or network inaccessibility of the application, the loss of a message pushed by a server, and other situations, thus improving the user experience satisfaction.

Second Embodiment

For ease of understanding, this embodiment is described below by taking an application type to which a currently frozen application belongs as well as a preset corresponding relationship between an application type and a temporary unfreezing rule as an example. In this example, the application types are divided into an instant messaging type (i.e., a first application type), a cyclic alignment data type (i.e., a second application type), and a strictly controlled data type (i.e., a third application type).

For the instant messaging type, in response to freezing an application, a first temporary unfreezing rule is configured for the application. In this example, the first temporary unfreezing rule includes detecting that a frozen application currently has data to be processed, and the data to be processed includes network data. In this case, when a terminal receives a message sent to the frozen application from a server, the application is unfrozen according to a callback operation of the first temporary unfreezing rule. The application continues to run after being unfrozen, so that a data packet received from the server is processed normally. After the application processes the data packet, it may be determined that the application meets a re-freezing condition and will be re-frozen, which is executed repeatedly.

For the cyclic alignment data type, in response to freezing the application, a second temporary unfreezing rule is configured for the application. In this example, the second temporary unfreezing rule includes: a continuous freezing duration of the frozen application reaches a preset freezing duration threshold (for example, 15 minutes); and/or a cache amount of the current data to be processed (including network data) of the frozen application reaches a preset data cache amount threshold. A timer may be started after the application is frozen. In this case, when the terminal receives the message sent to the frozen application from the server, it determines whether the frozen application needs to be unfrozen according to the second temporary unfreezing rule. For example, it is judged that whether the current cache amount reaches the preset data cache amount threshold, and if so, the application is actively unfrozen, and the application continues to run after being unfrozen, so that the data packet received from the server may be processed normally. If the current cache amount does not reach the preset data cache amount threshold, it may continue to be collected; and it may be judged whether the timer reaches 15 minutes, if so, the application is also unfrozen, and continues to run after being unfrozen so as to process the cached data packet accordingly. After the application is unfrozen, it is judged whether the unfreezing duration of the application reaches the preset unfrozen duration threshold (e.g., 1 minute), if so, it is determined that it meets the re-freezing condition and will be re-frozen, which is executed repeatedly.

For the strictly controlled data type, in response to freezing the application, a third temporary unfreezing rule is configured for the application, including: not unfreezing the frozen application. In this case, when the terminal receives the message sent to the frozen application from the server, it is determined to directly discard the received data packet according to the third temporary unfreezing rule until a freezing management END condition of the application is triggered to release the freezing management.

In an example of this embodiment, for an application of any above-mentioned application type, if a user actively clicks on the application, to switch the application to a foreground, the application may be unfrozen immediately, and all the management and control policies on the application are cancelled at the same time, and no network restrictions are imposed until the application switches to a background again.

It can be seen that the application control method provided in this embodiment may control the application in a dynamic freezing and unfreezing manner according to the application type, so that the application may normally send and receive the packet during a temporary unfreezing period, and may re-enter the freezing state after processing the data, thereby achieving the energy saving of the terminal and improving the user experience satisfaction.

Third Embodiment

Figure 2:
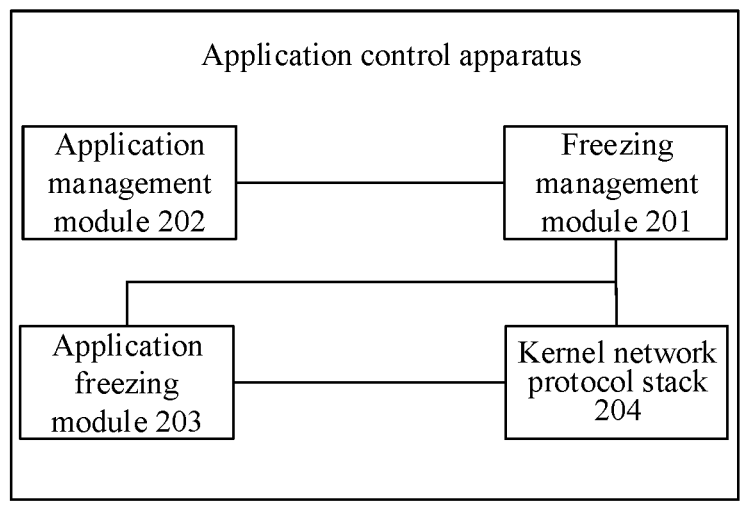
FIG. 2 is a schematic structural diagram of an application control apparatus provided in a third Embodiment of the present disclosure.

This embodiment provides an application control apparatus, which may be provided in a terminal, as shown in FIG. 2, and includes: a freezing management module 201, configured to: configure a corresponding temporary unfreezing rule for an application currently frozen in response to freezing a running application; temporarily unfreeze a frozen application in response to monitoring that the frozen application currently meets the temporary unfreezing rule corresponding thereto; and re-freeze a temporarily unfrozen application in response to monitoring that the temporarily unfrozen application currently meets a re-freezing rule corresponding thereto. The specific process of the freezing management module 201 to implement the above functions is shown in the above embodiments, which is not repeated here.

Referring to FIG. 2, in an example of this embodiment, the application control apparatus may further include an application management module 202, an application freezing module 203, and a kernel network protocol stack 204. The application management module 202, the application freezing module 203 and the kernel network protocol stack 204 may cooperate with the freezing management module 201 to implement the above application control method. The freezing management module 201 is responsible for the application status reported by other modules and the issuing of operations such as freezing, unfreezing and rule. For ease of understanding, this embodiment will be described below with a control process of the above modules as an example. The control process may be applied to an Android system framework, an IOS or other operating system framework. In an example, the application management module 202 and the freezing management module 201 are provided at a system framework layer. The application freezing module 203 is provided at a system kernel layer. For example, take an Android system as an example: Android is divided into four main functional layers from bottom to top, which are a Linux kernel layer, a system runtime layer (Libraries and Android Runtime), an application framework layer (Application Framework) and an application layer (Applications). The system framework layer refers to the framework part (system application framework layer) of an Android framework, which may include a resource management, including an application management. In an example, a freezing management shown in this embodiment may also be included, that is, modules and functions related to the freezing management in this embodiment are also added to the system framework layer. The system kernel layer is the core part of an operating system. For example, Android is the Linux Kernel, which realizes core functions such as a hardware device driver, a process and memory management, a network protocol stack, a power management, a wireless communication with the help of a Linux kernel service.

For ease of understanding, the control process is illustrated below in combination with the modules of the above examples.

When an application is started, the application management module 202 may determine which type of data management the application belongs to (for example, which of the three types shown in the foregoing embodiment), and then report to the freezing management module 201.

The application management module 202 reports to the freezing management module 201 that a running status of an application is a background running in response to detecting that the application is switched to a background during running.

After judging that the application can be frozen, the freezing management module 201 directly issues a command to the application freezing module 203 to freeze the application. If the application is the cyclic alignment data type, the application may be added to a cyclic alignment list for subsequent unified management.

The freezing management module 201 issues a corresponding rule (such as the temporary unfreezing rule and the corresponding re-freezing rule shown in the above embodiments) to the system kernel network protocol stack 204 according to the type of the application to be frozen.

The application freezing module 203 freezes the application after receiving the command sent by the freezing management module 201, and notifies the kernel network protocol stack 204 after the freezing is completed.

When the kernel network protocol stack 204 finds a received data packet and an application corresponding to the received data packet is in a freezing state, a temporary unfreezing rule corresponding to the frozen application is executed.

When it is determined to temporarily unfreeze the frozen application according to a first temporary unfreezing rule or a second temporary unfreezing rule, the freezing management module 201 issues a corresponding application unfreezing command to the application freezing module 203. In this embodiment, the temporary unfreezing rule for the application of the cyclic alignment data type may include: a continuous freezing duration of the frozen application reaches a preset freezing duration threshold (for example, 15 minutes). A cyclic alignment timer may be set for timing. When the cyclic alignment timer is time out, all applications in the cyclic alignment list may be unfrozen uniformly. The temporary unfreezing rule for the application of the cyclic alignment data type may include: a cache amount of current data to be processed of the frozen application reaches a preset data cache amount threshold. It may be confirmed that the temporary unfreezing rule is satisfied as long as any one of the two conditions is satisfied.

The freezing management module 201 may re-issue a freezing command to the application freezing module 203 to freeze the temporarily unfrozen application when a re-freezing condition of the temporarily unfrozen application is satisfied.

The above control process is repeated for a certain frozen application until a freezing management END condition of the frozen application is triggered to release a freezing management.

For ease of understanding, the control processes of an application of an instant messaging type (i.e., a first application type) and an application of a cyclic alignment data type (i.e., a second application type) are respectively illustrated below as examples in this embodiment.

Figure 3:
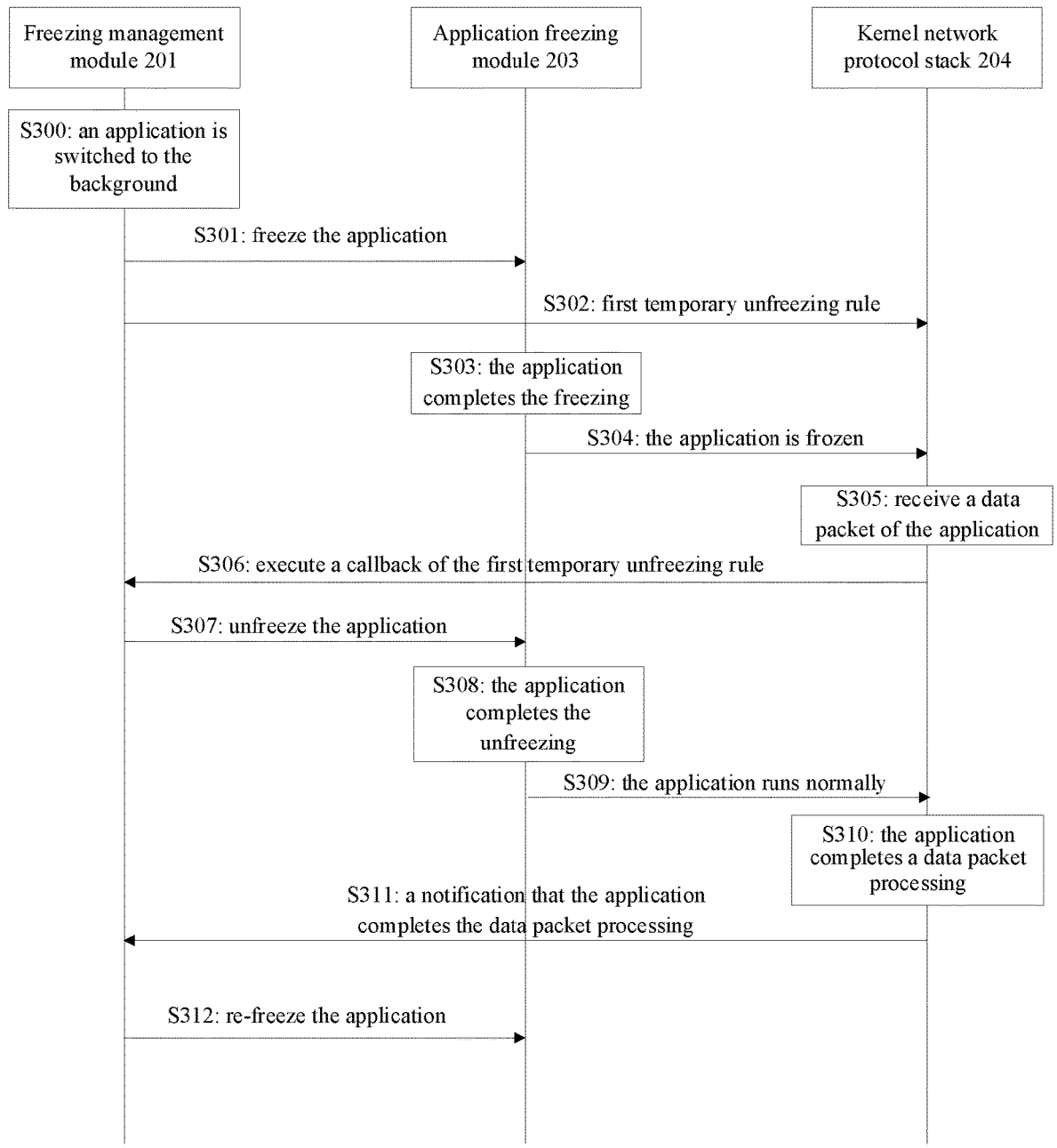
FIG. 3 is a schematic diagram of an application freezing control process of a first application type provided in the third Embodiment of the present disclosure.

As shown in FIG. 3, the control process for the application of the instant messaging type includes the following steps.

In S300, the freezing management module 201 receives a notification that an application with a UID (Android Application Identification ID) of 10001 is switched to the background; and the type of the application is the instant messaging type.

In S301, the freezing management module 201 sends an instruction to the application freezing module 203 to freeze the application.

In S302, the freezing management module 201 sends a corresponding first temporary unfreezing rule and a corresponding re-freezing rule of the application to the kernel network protocol stack 204.

In S303, the application freezing module 203 freezes the application.

In S304, the application freezing module 203 sends a notification that the application is frozen to the kernel network protocol stack 204.

In S305, the kernel network protocol stack 204 receives a data packet willing to be sent to the application with the UID of 10001.

In S306, the kernel network protocol stack 204 sends a callback request for the first temporary unfreezing rule of the application to the freezing management module 201.

In S307, the freezing management module 201 sends an instruction to the application freezing module 203 to unfreeze the application.

In S308, the application freezing module 203 unfreezes the application.

In S309, the application freezing module 203 sends a notification that the application runs normally to the kernel network protocol stack 204 after the application is unfrozen.

In S310, the kernel network protocol stack 204 detects that the application completes the processing of the data packet.

In S311, the kernel network protocol stack 204 sends a notification that the data packet processing is completed to the freezing management module 201.

In S312, the freezing management module 201 sends a freezing instruction to the application freezing module 203 to re-freeze the application.

Figure 4:
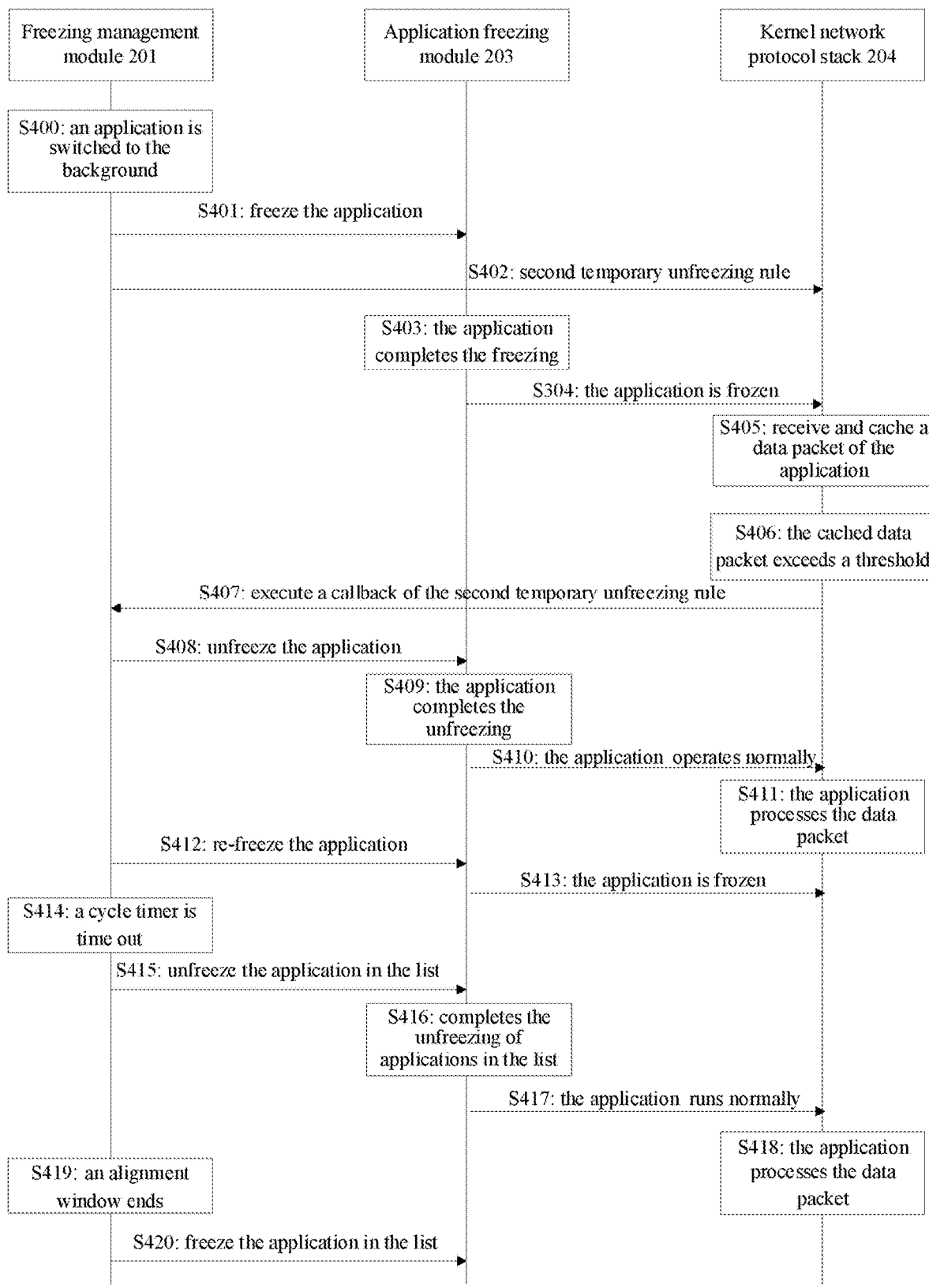
FIG. 4 is a schematic diagram of an application freezing control process of a second application type provided in the third Embodiment of the present disclosure.

As shown in FIG. 4, the control process for the application of the cyclic alignment data type includes the following steps.

In S400, the freezing management module 201 receives a notification that an application with a UID (Android Application Identification ID) of 10002 is switched to the background; and the type of the application is the cyclic alignment data type.

In S401, the freezing management module 201 sends an instruction to freeze the application to the application freezing module 203.

In S402, the freezing management module 201 sends a second temporary unfreezing rule and a corresponding re-freezing rule to the kernel network protocol stack 204.

In S403, the application freezing module 203 freezes the application.

In S404, the application freezing module 203 sends a notification that the application is frozen to the kernel network protocol stack 204.

In S405, the kernel network protocol stack 204 receives and caches a data packet wiling to be sent to the application with the UID of 10002.

In S406, the kernel network protocol stack 204 detects that the cached data packet corresponding to the application exceeds a threshold.

In S407, the kernel network protocol stack 204 sends a callback request for the second temporary unfreezing rule of the application to the freezing management module 201.

In S408, the freezing management module 201 sends an instruction to unfreeze the application to the application freezing module 203.

In S409, the application freezing module 203 unfreezes the application.

In S410, the application freezing module 203 sends a notification that the application runs normally to the kernel network protocol stack 204 after the application is unfrozen.

In S411, the data packet processing is performed.

In S412, the freezing management module 201 sends a freezing instruction to the application freezing module 203 to re-freeze the application.

In S413, the application freezing module 203 completes the re-freezing of the application and sends a notification to the kernel network protocol stack 204.

In S414, the freezing management module 201 determines that a cycle timer is time out, for example, 15 minutes.

In S415, the freezing management module 201 sends a release of each frozen application in the cyclic alignment list to the application freezing module 203.

In S416, the application freezing module 203 completes the unfreezing of each application in the cyclic alignment list.

In S417, the application freezing module 203 sends a notification that the application runs normally to the kernel network protocol stack 204.

In S418, the data packet for the temporarily unfrozen application is processed.

In S419, an alignment window ends, that is, the unfrozen duration reaches the preset duration.

In S420, the freezing management module 201 sends a freezing instruction to the application freezing module 203 to re-freeze the applications in the cyclic alignment list.

In an example of this embodiment, if the data packet currently received by the kernel network protocol stack 204 is to be sent to an application with a UID of 10003, and when the application with the UID of 10003 is an application of strictly controlled data type, the kernel network protocol stack 204 may directly discard the data packet.

Fourth Embodiment

Figure 5:
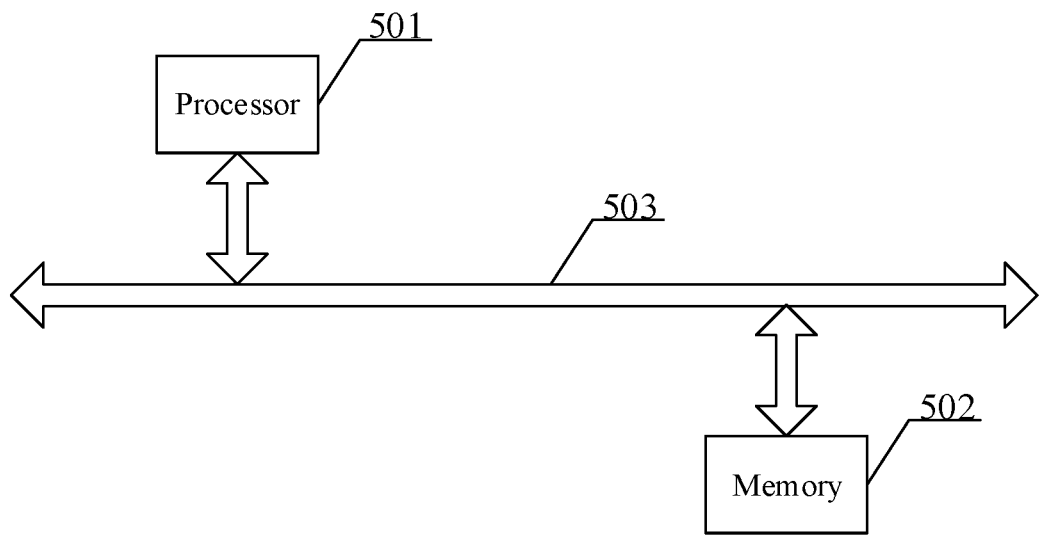
FIG. 5 is a schematic structural diagram of a terminal provided in a fourth Embodiment of the present disclosure.
Figure 6:
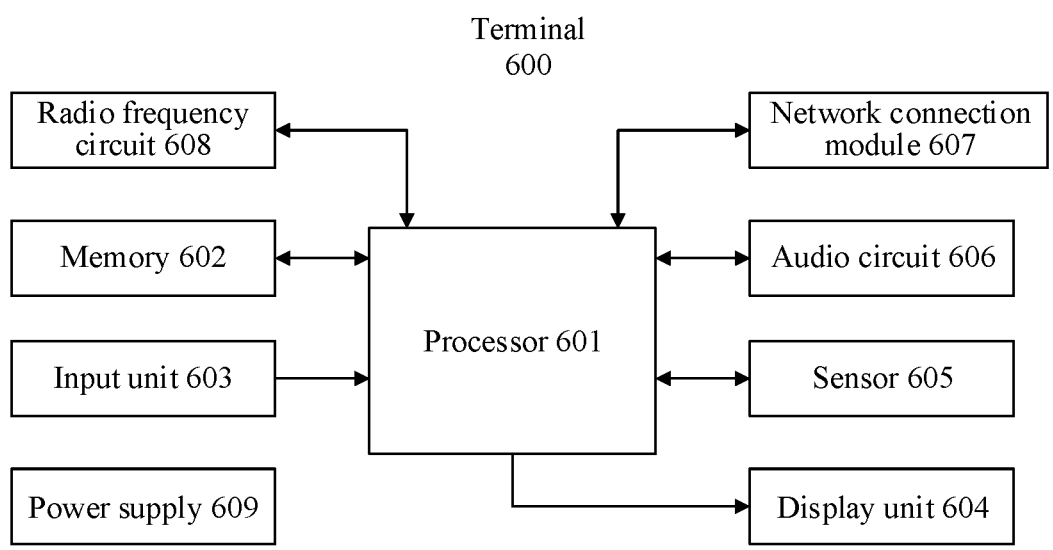
FIG. 6 is a schematic structural diagram of another terminal provided in the fourth Embodiment of the present disclosure.

This embodiment provides a terminal, which may be various communication terminals that may communicate with a core network through a base station, and may include various mobile terminals, or may be a non-mobile terminal that may communicate with the core network through the base station. Referring to FIG. 5, the terminal includes a processor 501, a memory 502 and a communication bus 503. The communication bus 503 is configured to connect the processor 501 and the memory 502. The processor 501 is configured to execute a computer program stored in the memory 502 to realize the steps of the application control method as shown in the above embodiments. The memory 502 here may be a memory of the terminal per se; it may include a memory provided in a terminal component that may not be separated from the terminal; and it is certain that it may also be set to include the memory provided in the terminal component that may be separated from the terminal as desired.

The terminal shown in FIG. 5 in this embodiment may be a mobile phone, a tablet computer, a laptop, a personal digital assistant, a smart TV, a mobile Internet device, a wearable device, or other terminal that may install an application client, or any other terminal or apparatus that may implement an application processing method of the present disclosure. In this embodiment, a specific structure of a terminal will be described as an example below. In a specific embodiment of the terminal according to the embodiments of the present disclosure, the terminal 600 includes components such as a radio frequency circuit 608, a memory 602 having one or more computer-readable storage media, an input unit 603, a display unit 604, a sensor 605, an audio circuit 606, a network connection module 607 (such as a Wi-Fi module), one or more processors 601, and a power supply 609. Those skilled in the art may understand that the above structure does not constitute a limitation on the terminal, and may include more or fewer components than the listed components. Herein, the radio frequency circuit 608 may configured to receive and send a communication signal, receive information of the base station, and then hand it over to the processor 601 for processing. The memory 602 is configured to store a software program (including but not limited to the above computer program) and a module, and the processor 601 executes various functions and data processing by running the software program or the module of the memory 602. The input unit 603 may be configured to receive input digital or character information. The input unit 603 may include various input devices, such as a touch screen input, and other input devices. Similarly, the input unit 603 converts all kinds of input information into a computer instruction and sends it to the processor 601, and may also receive a command from the processor 601 for execution. The display unit 604 is configured to display information input by a user or information provided by the terminal to the user and various graphical user interfaces on the terminal. The terminal 600 also includes at least one sensor, such as a light sensor, a motion sensor, and the like. The terminal 600 may also include components such as the audio circuit 606, the network connection module 607, and the power supply 609.

This embodiment further provides a computer-readable storage medium including volatile or nonvolatile, removable or non-removable media implemented in any method or technology for storing information (such as a computer-readable instruction, a data structure, a computer program module or other data). The computer-readable storage medium includes but is not limited to a random access memory (RAM), a read-only memory (ROM), an electrically erasable programmable read only memory (EEPROM), a flash memory or other memory technologies, a compact disc read-only memory (CD-ROM), a digital versatile disc (DVD) or other optical disc storage, a magnetic box, a magnetic tape, a magnetic disk storage or other magnetic storage devices, or any other medium that may be configured to store desired information and may be accessed by a computer.

In an example, the computer-readable storage medium in this embodiment may be configured to store one or more computer programs, which may be executed by one or more processors to implement the steps of the application control method as shown in the above embodiments. The computer-readable storage medium in this embodiment may be directly set in the terminal.

This embodiment further provides a computer program (or a computer software), which may be distributed on the computer-readable medium and executed by a computable device to implement at least one step of the application control method as shown in the above embodiments; and in some cases, at least one step shown or described may be executed in an order different from that described in the above embodiments.

This embodiment further provides a computer program product, which includes a computer-readable device, and the computer-readable device stores the computer program as shown above. The computer-readable device in this embodiment may include the computer-readable storage medium as shown above.

It can be seen that those skilled in the art shall understand that all or some of the steps, systems and functional modules/units in the apparatus in the method disclosed above may be implemented as software (which may be implemented by a computer program code executable by the computing device), firmware, hardware and appropriate combinations thereof. In a hardware embodiment, the division between the functional modules/units mentioned in the above description does not necessarily correspond to the division of physical components. For example, a physical component may have multiple functions, or a function or step may be cooperatively executed by several physical components. Some or all of the physical components may be implemented as a software executed by a processor such as a central processing unit, a digital signal processor or a microprocessor), or as a hardware, or as an integrated circuit, such as an application specific integrated circuit.

In addition, it is common knowledge of those having ordinary skill in the art that a communication medium usually includes the computer-readable instruction, the data structure, the computer program module, or other data in a modulated data signal such as a carrier wave or other transmission mechanism, and may include any information delivery medium. Therefore, the present disclosure is not limited to any specific combination of hardware and software.

The above content is a further detailed description of the embodiments of the present disclosure in combination with specific embodiments, and it cannot be considered that the specific implementation of the present disclosure is limited to these descriptions. For those having ordinary skill in the art to which the present disclosure belongs, some simple deductions or substitutions may be made without departing from the concept of the present disclosure, which should be regarded as falling within the protection scope of the present disclosure.

What is claimed is:
1. An application control method, comprising:
configuring a temporary unfreezing rule for an application currently frozen in response to freezing a running application;

temporarily unfreezing a frozen application in response to monitoring that the frozen application currently meets the temporary unfreezing rule corresponding to the frozen application; and re-freezing a temporarily unfrozen application in response to monitoring that the temporarily unfrozen application currently meets a re-freezing rule corresponding to the temporarily unfrozen application; wherein the re-freezing rule comprises at least one of the following:

an unfrozen duration of the temporarily unfrozen application reaches a preset unfrozen duration threshold;

the temporarily unfrozen application finishes processing a corresponding data to be processed; and the temporarily unfrozen application does not process data for a preset duration.

2. The application control method according to claim 1, wherein configuring the temporary unfreezing rule for the application currently frozen comprises:

configuring the temporary unfreezing rule for the application currently frozen according to an application type of the application currently frozen as well as a corresponding relationship between the application type and the temporary unfreezing rule.

3. The application control method according to claim 2, wherein the corresponding relationship between the application type and the temporary unfreezing rule comprises:

a first temporary unfreezing rule corresponding to a first application type, wherein the first temporary unfreezing rule comprises: detecting that the frozen application currently has data to be processed; and a second temporary unfreezing rule corresponding to a second application type, wherein the second temporary unfreezing rule comprises at least one of the following:

a continuous freezing duration of the frozen application reaches a preset freezing duration threshold; and a cache amount of current data to be processed of the frozen application reaches a preset data cache amount threshold.

4. The application control method according to claim 3, wherein the corresponding relationship between the application type and the temporary unfreezing rule further comprises:

a third temporary unfreezing rule corresponding to a third application type, wherein the third temporary unfreezing rule comprises: not unfreezing the frozen application.

5. The application control method according to claim 4, further comprising:

in response to that the application type of the frozen application is the third application type, and data to be processed for the frozen application is acquired, discarding the data to be processed acquired.

6. The application control method according to claim 3, wherein the data to be processed comprises network data sent to the frozen application.

7. The application control method according to claim 1, further comprising: releasing a freezing management of the frozen application in response to monitoring that a freezing management END condition of the frozen application is triggered; wherein the freezing management END condition comprises at least one of the following:

the frozen application stops running;

the frozen application is switched to a foreground to run; and it is detected that the terminal screen turns to a bright screen in a case that the frozen application was frozen due to that the terminal screen turned to a dark screen.

8. A terminal, comprising a processor, a memory and a communication bus; wherein the communication bus is configured to connect the processor and the memory; the processor is configured to execute a computer program stored in the memory to implement an application control method comprising:

configuring a temporary unfreezing rule for an application currently frozen in response to freezing a running application;

temporarily unfreezing a frozen application in response to monitoring that the frozen application currently meets the temporary unfreezing rule corresponding to the frozen application; and re-freezing a temporarily unfrozen application in response to monitoring that the temporarily unfrozen application currently meets a re-freezing rule corresponding to the temporarily unfrozen application; wherein the re-freezing rule comprises at least one of the following:

an unfrozen duration of the temporarily unfrozen application reaches a preset unfrozen duration threshold;

the temporarily unfrozen application finishes processing a corresponding data to be processed; and the temporarily unfrozen application does not process data for a preset duration.

9. The terminal according to claim 8, wherein configuring the temporary unfreezing rule for the application currently frozen comprises:

configuring the temporary unfreezing rule for the application currently frozen according to an application type of the application currently frozen as well as a corresponding relationship between the application type and the temporary unfreezing rule.

10. The terminal according to claim 9, wherein the corresponding relationship between the application type and the temporary unfreezing rule further comprises:

a third temporary unfreezing rule corresponding to a third application type, wherein the third temporary unfreezing rule comprises: not unfreezing the frozen application.

11. The terminal according to claim 9, wherein the data to be processed comprises network data sent to the frozen application.

12. The terminal according to claim 8, wherein the corresponding relationship between the application type and the temporary unfreezing rule comprises:

a first temporary unfreezing rule corresponding to a first application type, wherein the first temporary unfreezing rule comprises: detecting that the frozen application currently has data to be processed; and a second temporary unfreezing rule corresponding to a second application type, wherein the second temporary unfreezing rule comprises at least one of the following:

a continuous freezing duration of the frozen application reaches a preset freezing duration threshold; and a cache amount of current data to be processed of the frozen application reaches a preset data cache amount threshold.

13. The terminal according to claim 12, further comprising:

in response to that the application type of the frozen application is the third application type, and data to be processed for the frozen application is acquired, discarding the data to be processed acquired.

14. The terminal according to claim 8, further comprising: releasing a freezing management of the frozen application in response to monitoring that a freezing management END condition of the frozen application is triggered; wherein the freezing management END condition comprises at least one of the following:
- the frozen application stops running;
- the frozen application is switched to a foreground to run; and
- it is detected that the terminal screen turns to a bright screen in a case that the frozen application was frozen due to that the terminal screen turned to a dark screen.

15. A non-transitory computer-readable storage medium storing at least one computer program, and the at least one computer program may be executed by at least one processor to implement the application control method according to claim 1.

* * * * *